Sept. 22, 1953  R. KOMPFNER  2,653,270
HIGH-FREQUENCY ENERGY INTERCHANGE DEVICE
Filed June 19, 1947  5 Sheets-Sheet 1

Inventor
RUDOLF KOMPFNER

Sept. 22, 1953  R. KOMPFNER  2,653,270
HIGH-FREQUENCY ENERGY INTERCHANGE DEVICE
Filed June 19, 1947  5 Sheets-Sheet 2

Inventor
RUDOLF KOMPFNER
Nelson Moore
Atty.

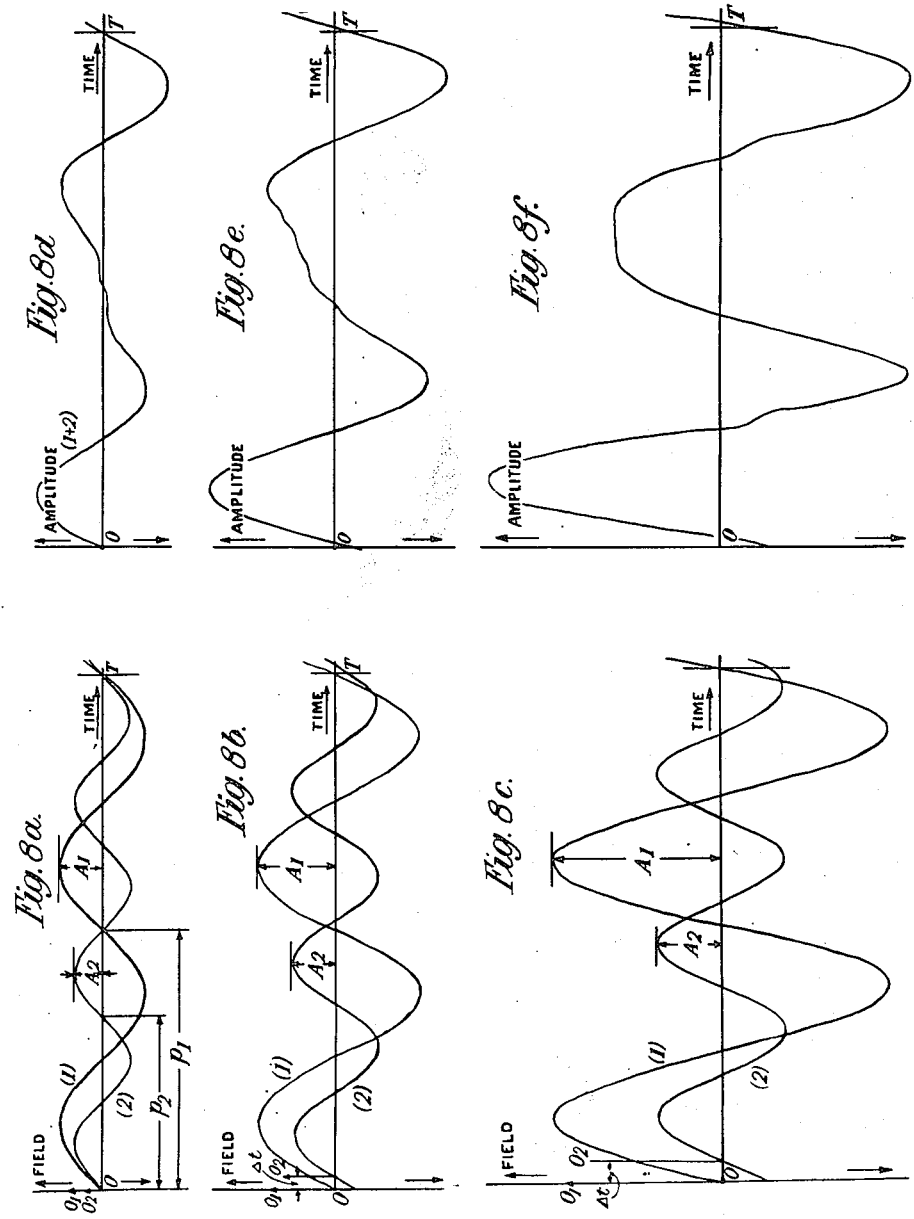

Sept. 22, 1953　　　　　R. KOMPFNER　　　　　2,653,270
HIGH-FREQUENCY ENERGY INTERCHANGE DEVICE
Filed June 19, 1947　　　　　　　　　　　　5 Sheets-Sheet 4
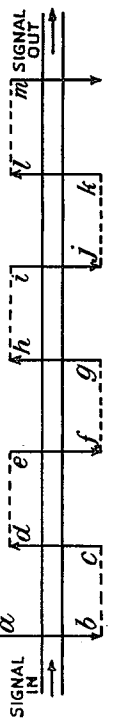
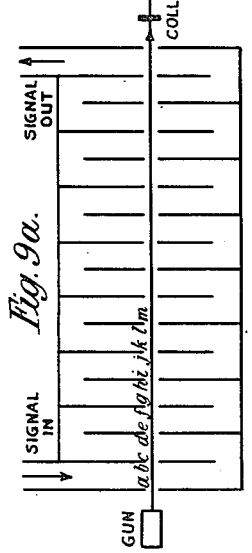
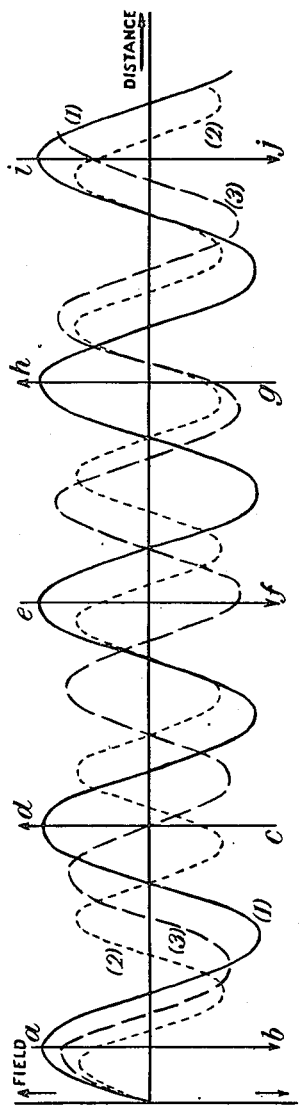
Inventor
RUDOLF KOMPFNER
Nelson Moore
Atty.

Patented Sept. 22, 1953

2,653,270

UNITED STATES PATENT OFFICE 2,653,270

HIGH-FREQUENCY ENERGY INTERCHANGE DEVICE

Rudolf Kompfner, Springfield, N. J., assignor, by mesne assignments, to English Electric Valve Company Limited, London, England, a corporation of England Application June 19, 1947, Serial No. 755,667
In Great Britain June 8, 1944

Section 1, Public Law 690, August 8, 1946
Patent expires June 8, 1964

18 Claims. (Cl. 315—3)

The present invention relates to electronic amplifying devices and methods.

More particularly the invention concerns travelling wave tubes in which a desired signal may be amplified by an energy interchange between an electron beam and a radio-frequency signal.

It is an object of the invention to provide an amplifying device having an electron beam and a wave which alternately act and react on each other.

It is an object of the invention to provide an amplifying device which is efficient to convert D. C. power to radio frequency power over a wide frequency range.

It is an object of the invention to provide an amplifier which will operate over a wide range of frequency.

It is an object of the invention to eliminate resonant circuits in an amplifier to yield a satisfactory gain over a wide range of frequency.

It is an object of the invention to provide a microwave amplifier which is sensitive and gives a reasonably uniform response over a wide range of frequency.

It is an object of the invention to provide means for the velocity modulation of an electron stream.

It is an object of the invention to provide an electron stream and a modulated wave which move in the same direction and in such relation that the wave increases in amplitude as it moves.

It is an object of the invention to velocity modulate an electron stream and thereby to induce an electromagnetic wave in a transmission line, the wave being propagated along the line.

Other objects, purposes and applications of the invention will appear as the specification proceeds.

Because of conflicting requirements which are mutually incompatible, the drift-tube type of high sensitivity microwave amplifier or klystron, yields an unsatisfactory energy transfer at the gaps which energy modulate the electron beam if operation is required over a wide frequency range.

In accordance with the present invention use is made in an electronic discharge device of interaction between travelling electric fields and an electron stream to produce amplification of high-frequency signals. Such a structure, which may be termed a retarded wave device, may comprise a conductor which provides a high-frequency energy path between two points longer than the straight line joining them, for example a helix, so that the component of velocity in a direction parallel to the said straight line of fields induced by an electromagnetic wave travelling along said path is reduced to a fraction of the velocity of said electromagnetic wave along said path, and an electron beam which passes adjacent said path, in a direction parallel to the straight line joining the two aforementioned points with a velocity of the same order as that of the aforementioned component of velocity of the fields induced by the travelling electromagnetic wave. The helical high-frequency energized coil referred to may be used to energy-modulate a group of ions in a mixed stream of ions so as to separate the lighter from the heavier, the latter passing through to a collector. The term energy-modulation as here used includes density modulation or "bunching" and velocity modulation.

In investigating the energy transfer between electron beams and electric fields or waves it appeared that their velocities should not differ too greatly. As electron beams which may conveniently be used in these devices travel at but a fraction of the speed of light, an electron beam accelerated by 2500 volts attaining a speed of about one tenth that of light, a loaded transmission line was employed to reduce the rate of propagation of the wave. The embodiments described successively below are set forth as examples and are not to be taken as limiting. They are illustrative only.

For such a line a helix of copper wire was used as the inner conductor and a brass tube as the outer conductor. A coaxial line suitable to work with a beam having a speed of about one tenth that of light was made of No. 18 standard-wire gauge copper wire, with an attenuation of two decibels per meter and an impedance of 500 ohms. Power can be readily put into and taken from such a structure by any of the known transforming methods.

A signal of 3000 megacycles was applied to the input end of the helix. With a beam current of one milliampere and a beam voltage of 2440 volts the radio-frequency output increased almost half as much again as when no beam was used. When the beam voltage was decreased there was a substantial loss of output, amounting to forty per cent at a beam voltage of 2200 volts.

With the above experimental information the factors for the construction of an amplifier having a good signal-to-noise ratio (as defined by the noise factor N) and a wide frequency band are at hand.

A helix of about sixty-six centimeters long and of No. 18 standard-wire gauge copper wire, wound on a quarter-inch mandrel, six turns/cm., was placed inside a long glass tube vacuum envelope. The beam voltage was set at 1830 volts and the effective wavelength within the tube was 7.7 millimeters. Due to losses in the copper and glass as well as imperfectly matched impedances the cold insertion loss was 3.5 decibels. The output from the tube was connected to a receiver having a noise factor of 16 decibels. With a beam current of one hundred and ten microamperes a net power amplification of six was obtained from the tube and the overall N of the system was fourteen decibels. There was some evidence of parasitic oscillations which in some instances persisted with beam currents as small as twenty microamperes. The value of N was improved only when more than ninety percent of the beam current was collected.

Another tube was constructed with a helix wound of No. 22 standard-wire gauge copper wire on a three sixteenth inch mandrel with about seven turns per centimeter and a total length of sixty centimeters. This construction yields a net power amplification of fourteen with a beam current of fifty microamperes of which forty microamperes were collected. The overall noise factor of the tube and receiver system was improved by four decibels over that of the receiver alone, the N of the tube being eleven decibels. The operation of the tube requires that the beam voltage be controlled within narrow limits. For example the amplification of the tube just described is zero for a beam voltage of 1780, rises to a sharp critical maximum at 1830 volts, falls immediately to an amplification of three at 1870 volts, dropping off to one-half at 1930 volts.

In the foregoing examples the electron beam was produced by an ordinary cathode-ray tube gun and focused by a short magnetic lens. The tube itself was surrounded by a thick soft iron shield, periodically demagnetized to eliminate the influence of stray fields. Radial dispersion due to space charge in the absence of a longitudinal magnetic field sets a limit to the maximum current that can be passed entirely through the helix to the collector.

The complete interaction between wave and beam can be synthesized from an infinite number of actions, alternatively, of wave on beam and of beam on wave. This theory as well as other theoretical explanations herein are presented in order that the invention may be more clearly understood. While the theory is believed accurate as far as it goes, it is not complete and is not to be taken as limiting in any sense. It is merely one interpretation of observed facts and the operation of the tube is not dependent upon the theory as presented. A number of factors of more or less importance have been neglected, such as the attenuation in the line and the effect of space charge. These omissions, however, do not vitiate the results obtained which present a reasonable estimate of the performance of a travelling wave tube.

The power amplification A may be found from the following equation:

$$A = \frac{1}{9}\left[\left(2\cosh\left(\frac{\sqrt{3}}{2}z\right) + \cos\left(\frac{3}{2}z\right)\right)^2 + \sin^2\left(\frac{3}{2}z\right)\right]$$

$z$ is a parameter given by $$z^3 = \frac{2\pi^3\alpha^2 Z I x^3}{V\lambda^3}$$

where $\alpha$=weakening factor of axial fields.
$Z$=impedance of helical line in ohms.
$I$=beam current in amperes.
$x$=length of tube in centimeters.
$V$=beam voltage in volts.
$\lambda$=wavelength in the helical line in centimeters.

To obtain sufficient amplification $z$ must be at least three, in which case $$A = \frac{1}{9} e^{\sqrt{3} \cdot z} \text{ approximately}$$

For large values of $z$, the induced noise (voltage)$^2$ approaches $$\frac{1}{9} \cdot \frac{1}{z^2} \cdot \overline{V_n^2} \cdot e^{\sqrt{3} \cdot z}$$

where $$\overline{V_n^2} = \frac{\pi^2 \alpha^2 Z^2 x^2}{\lambda^2} \cdot 2eI\Delta f \Gamma^2$$

where $e$=electron charge in coulombs.
$\Delta f$=bandwidth of receiver in cycles.
$\Gamma^2$=space-charge smoothing factor of beam.

If the noise power at the input of the amplifier is taken as equal to $kT\Delta f$ where $k$=Boltzmann's constant.
$T$=absolute temperature of the resistive component of the impedance into which the input is connected, then the noise factor of the tube is given by $$N = 1 + \frac{e\Gamma^2}{kT}(2\alpha^2 Z I V^2)^{1/3}$$

This appears to be independent of $x$, the length of the tube; however, this value of N was derived on the assumption that $z$ is large compared with unity and this assumption is warranted only for large values of $x/\lambda$.

It is to be appreciated that in the present invention provision is made for the continuous interchange of energy between the electrons in the beam and the electric field due to the signal wave propagated along the radio frequency path, the arrangement being such that velocity modulation of electrons in the beam is effected by the axial component of the aforementioned field. According to the theory of operation of the invention summarised before herein, amplification of the signal applied to input end of the energy transmission path will be obtained if during the transit of the beam through the interchange region the number of electrons passing from a region of accelerating field to a region of decelerating field is greater than the number of electrons passing from a region of decelerating field to a region of accelerating field. This follows directly from a consideration of the relative amounts of work done by those electrons while being decelerated and on them while being accelerated by the interacting field. It is apparent that in the process described the mean velocity of the beam will decrease, and the energy so released will be transferred to the propagated signal through the medium of the fields acting upon the electrons.

As has been described, the complete interaction process between the wave propagated along the energy transmission path and the electron stream may be synthesized from an infinite number of actions, alternately, of wave on beam and beam on wave. If a signal be applied to the input of the transmission path before the beam is introduced, an electromagnetic wave will be propagated therealong and an axial electric field will be set up in the interchange region. If the beam be then introduced, having a velocity approximately equal to that of the propagated wave due to the input signal, hereafter termed the primary wave, the electric fields will velocity modulate the electrons in the beam and so form bunches in the known manner. The mean velocity of the bunches will be equal to the velocity of injection of the virgin electron beam, and thus approximately equal to that of the primary wave. Immediately any bunching occurs, the passage of the beam through the interchange region will induce in the transmission path a secondary signal which will be propagated along the transmission path with a velocity equal to that of the primary wave, absorbing energy from the bunches and thus increasing in amplitude as it approaches the output end of the device. The physical principles governing such a process show that the phase of the induced voltage will lag 90° behind that of the inducing alternating current by which the changing charge density of the modulated beam may be represented. This secondary wave in turn will modulate the electron stream and so produce a tertiary wave lagging in phase by 90° with respect to the secondary wave and having a velocity of propagation equal to that of secondary and primary waves. The process is repeated ad infinitum and thus the total voltage at any point in the transmission path is given by the vectorial sum of the primary voltage and all the components generated in the interaction processes. A consideration of the process of vector summation shows immediately that the amplitude of the propagated compounded signal increases along the direction of travel of the beam, and that the lag in phase of that signal with respect to the primary component also increases progressively along the direction of travel of the beam. This increasing lag in phase is indistinguishable from that which would be produced if a single wave of increasing amplitude equal to that of the compounded wave were propagated along the transmission path with a velocity less than that of the original primary wave and hence also less than that of the electron stream. Thus it is apparent that electrons in their transit through the interchange region can pass from a region of accelerating field to a region of retarding field, and vice-versa. It may be shown by means of mechanical analogue that the increase in amplitude of the propagated wave as it travels along the energy transmission path in the direction of travel of the beam necessarily entails that more electrons pass from a region of accelerating field to a region of decelerating field than vice-versa, and thus that the required condition for amplification is fulfilled. In the analogue, the field in the interchange region at any instant may be represented by an undulating surface in which an accelerating field is represented by a down-grade and a retarding field by an up-grade, and the electrons by a stream of frictionless balls rolling over that surface along a path at right angles to the undulations, that is directly up hill and down. If the velocity of the balls entering the undulating path is initially constant, then there will be a continuous increase in velocity of the balls as they roll down hill and a continuous decrease on the next upward gradient. Thus their velocities will be greatest in the troughs and least at the crests. If the separation of the balls is initially uniform, then it will be apparent that on the down-grades the separation of any ball from the one following will increase as the balls approach the troughs and will decrease as they approach the crests. Simple reasoning will show that if the amplitude of the undulations is constant, then the maximum concentration of balls will occur symmetrically about the crests and the minimum likewise about the troughs. This follows from the fact that the decrease of velocity up hill in a given path length is equal to the increase in the corresponding path length on the next downward slope, and thus the velocity of the balls will be constant for a given path distance from a crest or trough, irrespective of whether they be travelling down hill or up. Thus at any instant there will be as many balls on any down-grade as on the succeeding up-grade. If, however, the amplitude of the undulations increases along the direction of travel of the balls, then the velocity at a given path distance from a crest on the up-grade will be less than at the same path distance from that crest on the succeeding down-grade and therefore the maximum concentration will be no longer symmetrically placed about the crests, but will be at some point on the up-grade. Thus at any time there will be a greater number of balls on any up-grade than on the down-grades on either side. This is equivalent in the electrical case to a concentration of electrons in a retarding field, which is the required condition for amplification of the propagated wave which in the mechanical analogue is represented by the increase in the degree of undulation.

An alternative theory of operation of a retarded wave device has been given by J. R. Pierce in an analysis of the mechanism of operation cited below. In this latter analysis electrons in their transit through the interchange region are assumed to pass successively through regions of accelerating and decelerating field. A postulated increase of the interacting electric field along the direction of motion of the electrons necessarily entails that more energy be given up by the electrons during retardation than be taken up in acceleration and, therefore, by reason of the reduction in the mean velocity of the electrons in the beam, energy is transferred from them to the propagated signal, which therefore increases in amplitude in its direction of propagation and thus the postulate is acceptable. It is apparent that the transitions assumed can only take place if there is a small but finite difference between the axial component of velocity of the propagated signal and that of the electron beam. A consideration of the mechanism of this second analysis will show that it too results in a concentration of electrons in a retarding field as they travel through the interchange region, and thus the Pierce analysis, and that of the applicant, are mutually consistent.

The analyses of the mechanism of operation of a retarded wave device operating in the manner of the invention show it to be necessary that more electrons pass from a region of accelerating field to a region of decelerating field than vice-versa, during the passage of the beam through the interchange region. It is immaterial whether this condition is achieved by single or multiple transits through fields of opposite polarity. The process of successive acceleration and retardation of any particular electron clearly differentiates the present invention from those known structures in which a somewhat similar configuration is used to extract energy from a previously modulated beam. In this latter process, the electron stream entering the retarded wave section of the device, from which power is delivered to an external load, has sensibly constant velocity but is density modulated, or is velocity modulated, and the apparatus is so arranged that the electrons can only give up energy to the propagated wave. This transfer is accompanied, as in the present invention, by a reduction in the velocity of the electrons, but the prior processes as described differ from the present invention in that the energy transfer is not reversible, it being deemed undesirable that electrons should at any time move from a field of one polarity to a field of opposite polarity. A further illustration of this fundamental difference is to be found in the method of injection of the signal. In the present invention, the mechanism which permits of abstraction of energy from the beam is also used to modulate it and the processes of modulation and energy abstraction occur concurrently; the signal input according to the present invention is applied to that end of the radio frequency path near the place of entry of the electron beam and is propagated along that path to the output point with increasing amplitude as described. In the prior art the mechanism for signal input or modulation of the electron stream is separate from the energy abstracting system; a grid or other modulating structure is used to impress the input signal upon the beam, the process of modulation being completed before the beam enters the region in which it may deliver energy to the propagated signal.

The invention cannot be regarded as a combination of the prior art outlined above and others concerned with the cumulative action upon a stream of electrons of the electric field due to some signal fed to and propagated along a suitable modulating system. Both processes as described are unidirectional, and rely for their operation upon an electron being acted upon by the R. F. fields in one way only during its transit through a region of interaction. Thus there is no mechanism available for the present process, and therefore the present invention cannot be realised by applying the method of use of either apparatus to the structure of the other.

Attention is invited to articles by the applicant on the present subject appearing in Proceedings of the Institute of Radio Engineers, vol. 35, No. 2, pp. 124–127 incl., February 1947, and in the "Wireless World" of November 1946. The same issue of Proc. I. R. E. at pp. 108–123 incl. contains two additional articles which discuss travelling wave tubes, develop the theory in some detail and present the small signal theory, the dependence of the wave propagation coefficients on voltage, current, circuit loss, and the other properties of the transmission mode which propagates energy and the cut-off transmission modes. Also presented are an expression for the field in a uniform transmission system due to an electron stream or any impressed current in terms of parameters of the transmission modes as well as the propagation constant and the field for unit power flow for the gravest mode of a helical transmission system. All four articles are incorporated in this specification by reference and made a part hereof. A further article by the applicant on the present subject will shortly appear in the "Wireless Engineer."

In this specification transmission lines will be taken to include waveguides and concentric lines. Retarded wave systems and devices as referred to herein include the many means by which the effective speed of travel of electric fields may be reduced until it is of the same order of magnitude as the speed of an electron beam. One method by which the effective as contrasted with the actual speed may be reduced is by means of a circuitous path. Where a helix provides the path, the speed of the wave around the turns of conductor comprising the helix may approximate the speed of light while the effective speed along the axis of the helix may be one tenth, one thirteenth that of light or any chosen value of that order of magnitude.

The helix may be regarded as the inner conductor of a coaxial transmission line in which the velocity of propagation of an electromagnetic wave therealong is only a small fraction of the propagation velocity of similar waves in free space.

Since the present invention involves the known principle of retarding the effective speed of travel of electric fields so as to be of the same order as that of an interacting beam of electrons, particles, systems or devices utilizing this principle are referred to in this specification as "retarded-wave" systems or devices.

In a "retarded-wave" device in accordance with the present invention, in addition to the known feature that the wave, in travelling from input to output, is "slowed down" due to the longer path it is constrained to take (e. g. along a helical conductor), the following new features are involved:

(a) The wave interacts continuously with the electron beam;

(b) The wave increases in amplitude in consequence of such interaction and does so approximately exponentially;

(c) The device accordingly amplifies the signal carried by the wave;

(d) The phase velocity of the wave is substantially independent of its frequency; a signal comprising a wide band of frequencies thus travels along the helical conductor at a velocity determined by the physical dimensions of the conductor and without such distortion as would occur if the velocity of the components of the signal varied according to their frequency. In other words the helical conductor is so constructed as to be non-dispersive.

(e) It follows from (d) that since the signal component velocities are all equal despite their difference in frequency, the electron beam will successfully interact with all these components at a single beam velocity and hence at a single value of beam voltage.

(f) The device is substantially "untuned," the input and output connections being so arranged as to effect a good match over a wide band of frequencies;

(g) In virtue of (d) and (f) amplification of signals carried by waves travelling between input and output points can be secured over a wide range of frequencies simultaneously.

It will be understood that alternative means for reducing the effective propagation velocity of an electromagnetic wave along a chosen path which may be utilised according to the invention are readily available.

For instance, a waveguide system may be employed in which the electromagnetic wave is characterised by an axial component of electric field and the electron beam projected along the axis of the guide. In this arrangement a reduction in the velocity of propagation of the electromagnetic wave along the waveguide may be achieved in known manner, for example, the guide may be partially filled with material having high dielectric constant and low R. F. loss, or alternatively irises in the form of annular discs may be placed at chosen intervals along the guide. By suitable choice of dimensions the previously defined optimum conditions for interchange of energy between the electron stream and the propagated wave, i. e. that more electrons in their transit through the interchange region pass from a region of accelerating field to a region of retarding field, are readily achieved.

Alternatively, the electromagnetic wave may be fed into a waveguide, operating in a transverse electric mode, folded in the manner of a "Chinese cracker." The electromagnetic wave in this arrangement is constrained to follow the circuitous path formed by the loops produced in the folding, while the electron beam is projected sequentially through each of the straight sections of the folded waveguide, and thus traverses but a fraction of the path taken by the electromagnetic wave. The configuration is such that the transverse electric field in the waveguide will be parallel to the direction of travel of the beam, and by suitable choice of dimensions the electrons in the beam may be made to pass from a region of accelerating field to a region of decelerating field during their transit across successive sections of the folded structure.

It will be appreciated that the coaxial system is substantially non-dispersive, that is the velocity of propagation of electromagnetic waves therealong is independent of frequency over a wide range unless the geometry be deliberately designed to produce a dispersive structure for a desired range of frequency. Therefore the previously defined optimum conditions for interchange of energy between the electron stream and the propagated wave may be maintained in the coaxial structure over an extremely wide range of frequencies. The waveguide structures are, however, intrinsically dispersive, the velocity of propagation therealong of electromagnetic waves and their wavelengths therein being a definite function of the periodicity of the wave and the form and dimensions of the waveguide.

The drawings are presented as illustrative of the invention which may take forms other than that shown. Like numerals refer to like parts throughout.

Figs. 8a–f are graphs showing the propagation of a composite wave through a travelling wave tube indicating the effect of dispersion in the energy path.

Figs. 9a and 9b are diagrams showing the interaction between fields and the electron stream in a folded waveguide.

Fig. 9c shows the field distribution due to a signal applied to the input of a folded waveguide system.

Figure 10:
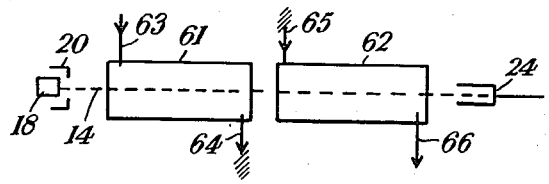

Fig. 10 is a schematic diagram of two retarded-wave devices with a common electron beam.

Figure 11:
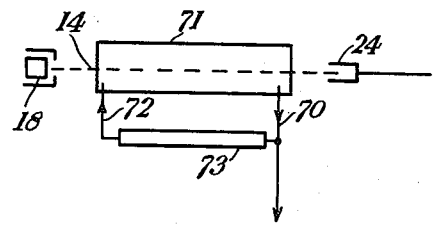

Fig. 11 is a schematic diagram of a single retarded-wave device arranged to operate as an oscillator by external back-coupling means.

Figure 12:
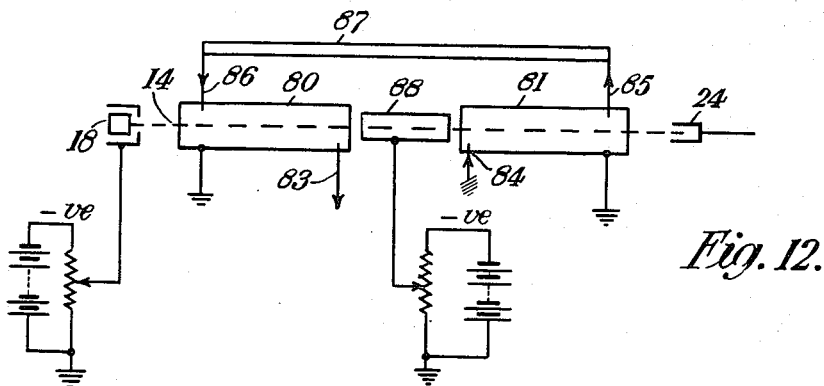

Fig. 12 is a schematic diagram of two retarded-wave devices with a common electron beam arranged to operate as an oscillator with external feed-back means and means for modifying the velocity of the beam in transit between the two devices.

Figure 13:
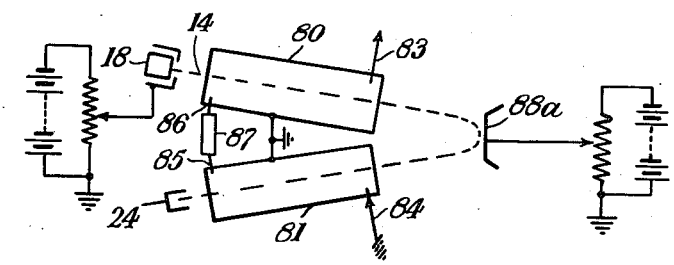

Fig. 13 is a schematic diagram of an alternative arrangement of the structure of Fig. 12.

Figure 14:
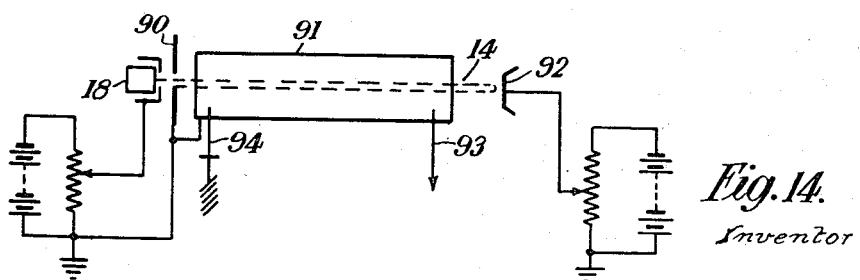

Fig. 14 is a schematic diagram of an arrangement according to Fig. 13 but in which the two retarded-wave devices are replaced by a single device through which the beam passes in both directions.

Figure 1:
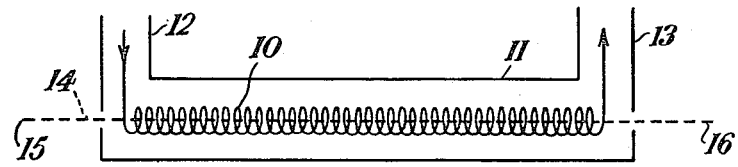
Fig. 1 shows one form of a retarded-wave device associated with an electron beam wherein the particles or electrons constituting the beam are velocity modulated.

A simple form of retarded-wave device is shown in Fig. 1 in which a helix 10 of copper wire or the like comprises the inner conductor of a concentric line and is surrounded by copper tube 11 which forms the outer conductor. Tube 11 is provided with a power input portion 12 by means of which radio frequency or signal power may be introduced into the device. Output point 13 is provided at the opposite end of tube 11. Tube 11 together with input 12 and output 13 function in the manner of a transmission network and care must be exercised to match impedances to prevent loss. The theory and experimental work referred to above would seem to indicate that the electric fields set up within helix 10 by the application of power to input 12 and the passage of the power along the concentric line to output 13 would be to a large degree axial and the electric fields set up by the same means between the helix 10 and tube 11 are mainly radial. If, then, an electron gun or similar source of an electron beam 14 is so positioned that beam 14 is projected from point 15, which may represent a projector on the input end of concentric line 10, 11, so as to travel in a substantially straight line along the axis of helix 10 to a point 16 on the output end of the line which may represent a collector, it has been found that with such an arrangement the beam 14 is velocity modulated or energy-modulated by the action on it of the axial electric field set up by the signal or radio frequency power supplied at input 12 and an augmented signal may be taken from the output 13.

Figure 2:
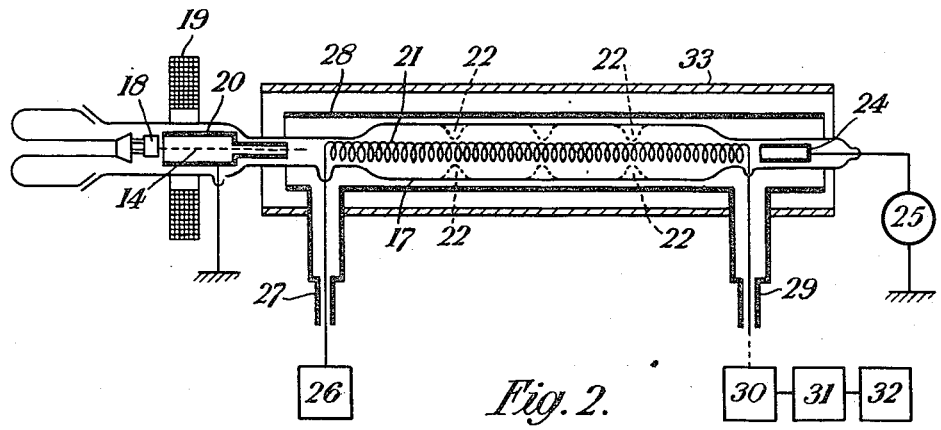
Fig. 2 is a vertical section of a schematic layout of one form of an electron beam velocity modulating device.

Fig. 2 presents a more complete showing of one form the invention may take. An evacuated glass envelope 17 has an electron gun 18 mounted in one end and so positioned as to project a beam 14 axially along and within envelope 17. A magnetic focusing coil 19 serves to concentrate the emitted electrons into a stream and cooperates with screen 20 to that end. Screen 20 is grounded and acts as a collimator, greatly reducing shot noise. Beam 14 is confined and travels along the axis of helix 21 formed of copper wire centrally positioned by glass dimples 22 which serve to keep it aligned. A collector 24 is sealed within envelope 17 at its opposite end and is positioned in alignment with the axis of helix 21 in the path of beam 14. Collector 24 is grounded through milliammeter 25 which measures the current in beam 14.

An ultra-high-frequency wave source 26 capable of initiating waves having a wavelength of the order of ten centimeters is connected to input 27 of the concentric line comprising outer copper tube 28 and helix 21. Output 29 is connected through mixer 30 to receiver 31. For test purposes a cathode ray oscillograph 32 may be connected to receiver 31.

A soft iron tubular shield 33 surrounding and spaced from outer conductor 28 may be provided if desired to reduce noise and the effects of stray fields.

Figure 3:
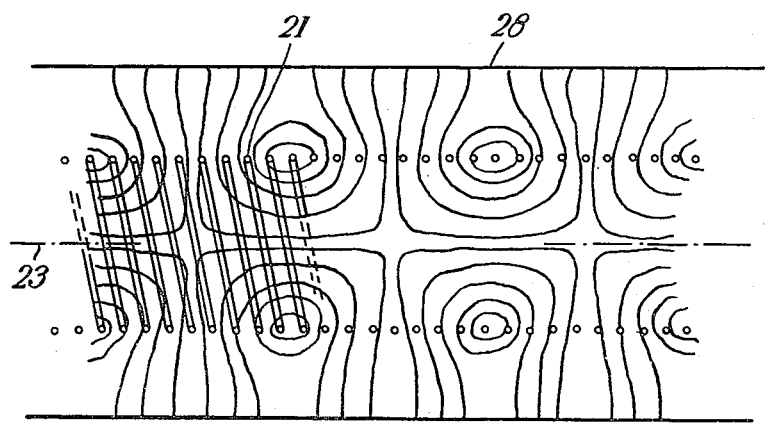
Fig. 3 is a diagram of probable lines of electric force in the device shown in Fig. 2.

Fig. 3 presents a visualization of the electrical field within the concentric conductor due to the passage of high frequency energy along helix 21. The field was established with reasonable accuracy by means of a probe and a large coil. It will be noted that along axis 23 the field lines mutually flatten each other out so that within helix 21 the electric field lines are reasonably parallel to axis 23. The field lines are believed to be normal to the surface adjacent tubular copper conductor 28. It follows that the field lines between helix 21 and copper tube 28 are substantially normal to axis 23 and extend radially therefrom uniformly in all directions.

It has been found that electric waves travelling along helix 21 have a component of velocity along the axis of the helix of approximately one-tenth to one-twelfth of that of the free-space propagation velocity. During operation of the device shown in Fig. 2 the electrons of beam 14 are velocity-modulated by the travelling electric fields which are mainly axial within the helix 21. This modulation results from the bunching of electrons by local accelerating and retarding portions of the electric fields. The initially uniform electron beam is thus step by step converted into a beam possessing an axial variation of charge density. The passage of electron beam 14 through helix 21 causes currents to be induced in the helix which will build up as they travel therealong and which represent power transferred to the helix from the electron beam. The helix 21 thus serves simultaneously as a "catcher," "bunching" and "catching" taking place throughout its length. At a result, when signal power is fed into helix 21 at its input end 27 the power is amplified by the interaction of the travelling electric fields and the electron beam 14 as they travel along. As a result more high frequency power emerges at the output end 29 of the device than is fed to its input end.

The wave set up in helix 21 by the high frequency power may travel in either direction. When its motion is in a direction opposite to that of beam 14 there is little effect. Where the wave travels in the same direction as beam 14 it appears to be divided into three waves. Due to the action of the beam, one of these is attenuated, one is unaffected and the third experiences negative attenuation or is amplified as it moves along. The effect has been referred to as suggesting a breeze blowing past ripples in a stream. The amplitude of the ripples increases as the breeze blows them along.

Figure 4:
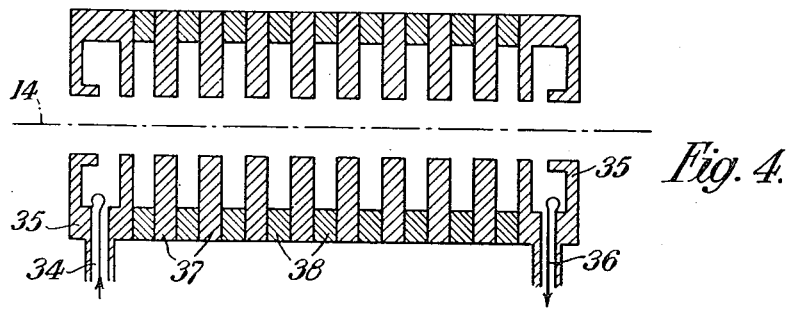
Fig. 4 is a longitudinal section of another form of retarded-wave device with velocity modulated beam.

Fig. 4 represents a retarded-wave device in which the electromagnetic wave is propagated in guide having its wall formed by the inner cylinas already described. The end sections 35 and 35 of the waveguide are of hollow cylindrical form provided with coupling loops 34 and 36, through which power may be fed into and taken from the waveguide system. The waveguide is constructed from annular elements 37, 38, having differing inner radii, the apertures in sections 37 corresponding in size to the aperture in end sections 35, 35, while those in sections 38 correspond in size to the radial dimension of the cylindrical cavities in sections 35 and 35. When parts 35, 35, 37 and 38 are coaxially aligned it will be seen that sections 37 constitute loading irises set at intervals along a cylindrical waveguide having its wall formed by the inner cylindrical surfaces of sections 38. This configuration reduces the velocity of propagation of an electromagnetic wave through the waveguide system, and might be regarded as doing so by providing a circuitous path for the currents flowing in the inner surface of the guide as a result of the transmission of energy through it. Electron beam 14 is projected axially and centrally through the waveguide system and interacts with the axial component of electric field therein.

Figures 5, 5A:
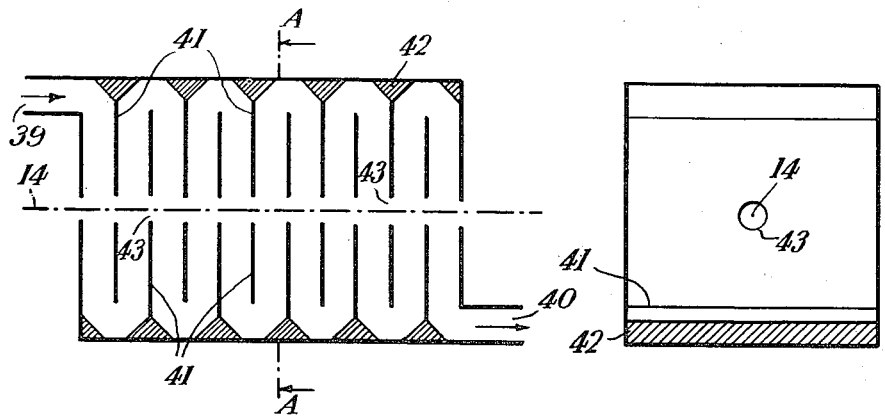
Fig. 5 is a retarded-wave device utilizing a folded up waveguide.
Fig. 5A is a section along line A—A of Fig. 5.

Fig. 5 illustrates in section a retarded-wave device in which is used a waveguide operating in the transverse electric mode. Power is fed into the open end of the waveguide system 39 and taken out at 40. Electron beam 14 is projected normally through aligned holes 43 in plates 41, which constitute a common wall of adjacent sections of the folded structure and interact in the desired manner with the transverse electric field in the waveguide, which is substantially normal to plates 41 in the regions of interaction. The wedge-shaped sections 42 serve to minimise reflections at the abrupt turns in the folded waveguide. Fig. 5A, a section through a plane at right angles to the plane of Fig. 5, shows the aligned apertures 43 in plates 41.

It will be seen that in all the constructions shown the radiofrequency power circuit is complete and energy can be transmitted whether or not beam 14 is present. When beam 14 interacts in the manner previously described with the fields induced by radiofrequency signals fed into the system, the device may serve as an amplifier for those signals. It will be apparent to those skilled in the art that by providing a back-coupling system between output and input circuits, for example by means of an external transmission line of such length that the signal fed back is substantially in phase with the input signal or by arranging that reflection takes place at the ends of the retarded wave device, the device according to the invention may operate as an oscillator. By providing a biased collector arrangement such that only those electrons having velocities greater than a chosen minimum are able to strike a target electrode, the non-linear relationship between collector current and signal input voltage so obtained will permit the apparatus to operate as a rectifying or mixing system for radiofrequency signals fed into retarded-wave sections and amplified according to the invention during their transmission therethrough.

Figure 6:
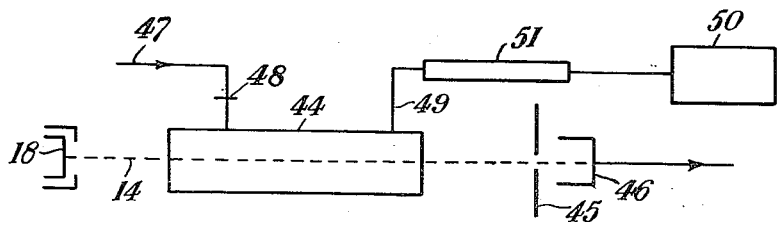
Fig. 6 is a retarded wave device arranged to operate as rectifier or as a mixer with a circuit which differs somewhat from that shown in Fig. 2.

In Fig. 6 gun 18 projects beam 14 through retarded-wave device 44 and apertured plate 45 to collector 46.

The apertured plate 45 is positioned, and the potential of the collector 46 with respect to the beam accelerating voltage is so arranged that only those electrons having a velocity greater than a chosen minimum can pass through plate 45 and reach collector 46. The signal to be rectified is fed to input 47 of the retarded-wave device 44. During the interaction process amplification of the signal is obtained and electrons leaving device 44 will be velocity modulated by the amplified signal. The velocities of the electrons leaving device 44 will be greater or less than the mean velocity of the beam by amounts depending upon the direction and intensity of the axial electric field near the terminal end of the device 44 at the time the electrons leave it.

The apertured plate 45 is maintained at ground potential, i. e. the same as collector 24 of Fig. 2. Collector 46 is maintained at a negative potential with respect to the apertured plate 45, so that a suitable retarding field exists between them. Under these conditions current will flow in the circuit of collector 46 only when those electrons which have a velocity sufficient to overcome the retarding field reach the collector 46. Rectification is obtained in the normal manner when the retarding field between plate 45 and collector 46 is of such an intensity that only those electrons having velocities greater than the mean velocity of the beam 14 reach the collector 46.

If the signal input to device 44 is a modulated radiofrequency signal then the modulating signal may be obtained in the collector circuit by simple rectification in a known manner.

If two radiofrequency signals be propagated along device 44 and interact with the electron stream then by suitable choice of collector circuit arrangement a beat frequency signal may be obtained by rectification in the circuit of collector 46. The device thus operates as a mixer.

In the circuit of Fig. 6 the second radiofrequency signal is supplied by local oscillator 50 through attenuator 51 connected to device 44 by wire 49. As this second signal travels from the output end toward the input end of device 44 there is no effect with which the present invention is known to be concerned as the signal travels counter to beam 14. The second signal is reflected to a small extent at 48 by a controlled amount of impedance differential or mismatching and the above discussed effect occurs.

Figure 7:
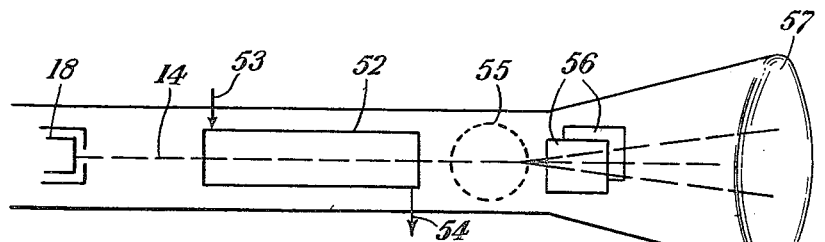
Fig. 7 is a schematic diagram of a retarded wave device associated with a cathode ray oscillograph.

In cases where the retarded wave device is to be essentially non-resonant or untuned, care must be taken to avoid energy reflections at more than one point in the system. Such use requires that at least one end of the concentric line, waveguide, conductor or other form of transmission line must be matched to its termination load.

Where the retarded-wave system is resonant or tuned to a particular frequency or a narrow range of frequencies, reflections of energy will be permissible at either end of the system. Where the distance between reflecting points is an integer multiple of electrical half-wavelengths, the system will be resonant at a frequency corresponding to the wavelength required. In this case the intensity of the electric fields interacting with the electrons will be increased as compared with the first case abovementioned where the system is non-resonant.

Where it is desired to operate the device at centimeter wavelengths as a cathode ray oscillograph by the provision of a suitable screen and sharply focusing the electron beam so it will fall on the screen after being modulated, the structure of Fig. 7 may be used. Gun 18 projects beam 14 through a retarding-wave device 52 having input 53 and output 54 connected to a non-reflecting termination.

The retarded-wave device 52 is substantially untuned having a wide frequency range. The beam passes from device 52 through a transverse magnetic field provided by a magnetic system 55 and thence between deflecting plates 56 to a screen 57. In passing the magnetic field of the system 55, the previously velocity modulated beam is deflected laterally, the amount of deflection depending upon the differing velocities of the electrons in the beam, as will be readily understood. If now a time-base generating voltage is applied to the deflecting plates 56, the signal to be analysed being incident upon the input 53, a visual indication of the waveform of the signal at the input 53 may be obtained on screen 57.

If the pattern of the fields acting upon the electron beam during its transit through the energy interchange region in the configurations previously described be considered, the limitation imposed upon operation of the device over a wide range of frequency is readily appreciated.

In the case of the non-dispersive helical structure, the velocity of propagation of the fields induced by energy transmitted through the retarded wave section will be independent of frequency. Therefore, the necessary requirement for maximum efficiency of operation that the electron beam velocity as determined by its accelerating voltage shall be greater by a fixed amount than the velocity of propagation of the interacting electric field may be satisfied irrespective of the frequency of the input signal, and the amplification of the system will be constant. A signal of other than pure sinusoidal waveform applied to the device can be regarded as being compounded of any number of components having sinusoidal waveform and a fixed phase and amplitude relationship (e. g. a modulated signal that may be resolved into a carrier frequency component and its associated sidebands). In the non-dispersive system, the electric fields induced by the transmission of the component signals through the energy conducting path will have the same velocity of propagation, and therefore the electron beam will interact in the required manner with each and all of the component fields so that an amplified signal is obtained at the output end of the device which is identical with the input signal in all characteristics except amplitude.

In the case of dispersive energy transmission paths such as the loaded waveguide and the folded system previously described, the effect of dispersion on the operation of the device is best understood by considering independently the differences in efficiency of energy interchange occasioned by variation of the velocity of propagation of the fields and the effect of such dispersion on the characteristics of the applied signal. It will be apparent that the optimum conditions for energy interchange can only be obtained at one input signal frequency. For frequencies greater or less than this there will be a falling off of amplication, the decrease being estimable from a knowledge of the variation of velocity of propagation with frequency which may be derived from the geometry of the system, and of the variation of efficiency of energy interchange with difference of the electron beam velocity and that of the propagated wave. If a composite signal is applied to the system, then not only will the amplification of the component signals be unequal, but in addition the difference in velocity of propagation of those waves will result in a change in the phase relationship of those components during their transmission through the retarded wave transmisison path. Thus the output signal obtained will differ in characteristics from the input signal in all respects, and satisfactory operation of the device will be limited to a range of frequency in which such differences of characteristic are acceptable for the application envisaged.

If energy interchange takes place in the fields existing in some component of a resonant circuit, such as the gap of a rhumbatron resonator, then the amplitude-frequency characteristic of the system will also modify the output waveform and consequently restrict the range of frequency of operation, which restriction will also depend upon the dispersion of the transmission system to which the resonators may be connected.

Fig. 8 shows diagrammatically the variation with time of the fields corresponding to the components of a composite signal fed through the energy transmission path of an amplifier using the retarded-wave principle. Fig. 8a shows two components of differing amplitude $A_1$, $A_2$, and periodicity $P_1$, $P_2$, and definite phase relationship which combine to form the composite signal shown at $d$. Each and all of the waveforms in Figs. 8a, b, c, d, e, and f repeat continuously the waveforms shown between the points O and T on the diagrams. For the purpose of analysis the waveform $d$ is taken as representing a composite signal entering the energy transmission path at the input end. The waveforms in $a$ may then be taken as representing the variation with time of the fields induced by the components of that signal near to the input end of the transmission path. In the case of a non-dispersive path, the components will be propagated along the path with the same velocity, so that their phase relationship is maintained. Thus by interaction with the electron beam associated with the path, each will be amplified in the same degree, and an output signal similar in all characteristics but amplitude to the input signal may be taken from the terminal end of the device.

In the case of a dispersive transmission path, the difference in propagation velocities $V_1$, $V_2$ of the two field components induced by the composite input signal will result in a difference of the degree of intensification of those fields by interaction with the electron beam during their propagation through any section of the transmission path. This is shown in Figs. 8a, b and c in which is shown the variation with time of the fields at the input end of the device, at the halfway point and at the output end. It will be noted that the ratio of $A_1$ to $A_2$ changes as the fields are propagated along the transmission path. In addition to the change in relative amplitude, there will be a change in the phase relation of the two components. The component 1 will be propagated a distance $x$ in a time given by $x/V_1$, and the component 2 will arrive at $x$ after a time given by $x/V_2$, from which it is apparent that a difference in phase is produced which is given by $$t = \left(\frac{1}{V_1} - \frac{1}{V_2}\right)$$

This is illustrated in Figs. 8a, b and c in which the separation in time of the occurrences of zero field from either component at the fixed points chosen is represented by this distance between $O_1$ and $O_2$. The resultant composite signals at the points chosen are shown in Figs. 8d, e and f, and it is immediately apparent that the characteristics of the signal change continuously during transmission through the system. It will be appreciated that the effect of dispersion is increased as the path length increases or as the velocity of propagation of electromagnetic waves therealong is reduced, from which (since velocity=wavelength×frequency), it follows that for a given physical length of path, the dispersion effect increases as the number of wavelengths corresponding to that path is increased.

The foregoing analysis, although applicable to any dispersive system, is most easily appreciated when applied to structures in which the direction of propagation of the electromagnetic wave is parallel to the direction of the beam and interaction takes place between the beam and the axial component of the electric field of the propagated wave. In the case of the folded structure, where interaction with the electric field may be continuous so far as the beam is concerned but in which the propagated wave follows a path such that interaction takes place only at defined regions in that path, the representation of Fig. 9 may give a clearer picture of the effect of the frequency-dependent properties of the system. The configurations of Figs. 9a and 9b may be regarded as equivalent if the electron stream is assumed to be moved instantnaeously from $b$ to $c$, from $c$ to $d$, and from $d$ to $e$ and so on. Fig. 9c represents the field distribution along the transmission path at any given time. The electron beam can then be regarded as passing successively through the fields at $ab$, $cd$, $ef$, $gh$, $ij$ to interact with them and give intensification of those fields if the required conditions are satisfied. It will be seen that component 1 will give alternate acceleration and deceleration and produce amplification of that component signal, but that component 2 will give acceleration at all interaction regions and thus the electron stream will absorb energy from the field and give rise to attenuation of that component of the transmitted signal. It should be noted that this effect will occur whether or not there is dispersion in the transmission path. Any effect of dispersion will be added to that resultant from the difference in wavelength which accounts for the difference in interaction described above. Component 3 illustrates a wave in which the action of the field on the electron beam will give successively acceleration, no effect, deceleration, acceleration, small acceleration. Thus it will appear that the amplification of the device will depend upon the frequency of the input signal, and that even in the absence of dispersion, the characteristics of the input and output signal may differ entirely. If the fields in the interaction regions are produced in the capacitive elements of resonant circuits such as rhumbatrons, set at intervals along a transmission line, it is obvious that the amplitude-frequency characteristics of the circuit will also modify the performance of the device.

In Fig. 10 is illustrated a system in which two travelling wave amplifiers operating in the manner of the invention may be combined to form a system giving greater amplification than may be obtained from a single amplifier and also isolation of the input and output circuits one from the other. The energy transmission paths of retarded-wave devices 61 and 62 are arranged end to end in close proximity with their axes in line and beam 14 is projected through each in turn from cathode 18 to collector 24. The signal to be amplified is fed to the input 63 of the first section 61 to the output 64 of which is connected a non-reflecting terminating load. A similar non-reflecting termination is connected to the input 65 of the second section 62, from whose output 66 power is fed to the utilisation circuit. During its transit through the interchange region of the first section 61, the beam interacts in the manner previously described to produce amplification of the signal propagated along the energy transmission path of that section, and leaves the interchange region with a degree of bunching dependent upon the magnitude of the amplified signal. Entering the second section 62 the bunched beam will induce in the transmission path of that section a signal, which will be propagated along the path and interact in the manner of the invention with the electron stream during its transit and so will be amplified before being delivered to the utilisation circuit at output point 66. It is to be appreciated that the axial separation of sections 61 and 62 does not constitute a drift space in which bunches are formed in the beam following velocity modulation by the signal applied to the first section, and thus the structure is clearly distinguishable from those in which the front section of a double unit acts as a modulator and the second as an energy abstracting system. Each of the sections 61 and 62 of Fig. 10 operates in the normal manner as a retarded-wave amplifier, and the arrangement may be regarded as a single amplifier in which a short section of the energy transmission path is removed in order that the input and output points are electrically isolated so to obviate the possibility of back-coupling through the transmission path. This feature is of considerable importance in obtaining extremely high amplification without oscillation.

Figs. 11, 12, 13 and 14 show arrangements in which dispersive structures are used to generate oscillations whose frequency may be varied continuously through alteration of the beam velocity by variation of the beam accelerating voltage.

In the arrangement of Fig. 11, power is taken from the output point 70 of the retarded-wave device 71 and a small fraction of it fed back to the input point 72 through the feed back-path 73. It will be appreciated from the foregoing analyses that if the energy transmission path of device 71 is dispersive, then maximum amplification will be obtained only at one particular frequency for any chosen beam velocity. If oscillation is to be maintained, the phase of the signal fed into the input 72 must be such that it augments any signal propagated along the transmission path from input point 72 to output 70, and this condition can be maintained for all frequencies if the sum of the number of wavelengths in the transmission and feed-back paths is maintained constant irrespective of any change in frequency. Such a condition may be realised if the dispersion in the transmission and feed-back paths is of opposite sign, i. e. if an increase of frequency reduces the velocity of propagation in the transmission path of 71, then an increase of frequency must reduce the velocity of propagation in the feed-back path 73, and vice-versa. From experimental evidence it would appear that by suitable choice of geometry a helical structure can be designed to have dispersion of either sign in a chosen range of frequency and thus by employing a helical structure of one kind for the transmission path of 71, and one of the other kind for the feed-back path 73, the construction of a system such as that shown in Fig. 11 may be achieved. It will therefore be apparent that by the normal process of build up from noise of oscillations in an amplifying system with feedback from output to input points, a signal can be generated whose frequency is that for which maximum amplification is obtained for any chosen value of beam accelerating voltage.

Fig. 12 shows a modification of the arrangement of Fig. 10, in which two retarded-wave devices having dispersive energy transmission paths are combined to form an oscillating system in which the frequency of oscillation may be controlled by variation of the beam accelerating voltage and in which the necessity of providing a feed-back path having dispersion of opposite sign to that of the transmission paths is obviated. In Fig. 12, the beam 14 is projected in turn through the interchange regions of the retarded-wave devices 80 and 81 and interacts in the manner of the invention with any electromagnetic waves propagated therethrough. Power is taken from output point 83 of system 80. Input 84 of system 81 has connected to it a non-reflecting terminating load and power is fed back from output point 85 of system 81 to input point 86 of system 80 through a feed-back path 87. An auxiliary hollow electrode 88 through which the beam 14 passes is placed between sections 80 and 81, which by variation of the potential applied to it may be made to increase or decrease the velocity of the electron beam in the region between 80 and 81, and so to vary the time taken by the beam in transit between the two retarded-wave devices. The feed-back path 87 is non-dispersive, and may conveniently be of concentric line construction. Its electrical length is negligible compared with that of the two retarded wave sections.

As in the construction of Fig. 11, maximum amplification will be obtained at only one frequency for a chosen beam accelerating voltage, and oscillations can only be built up if the phase of the fed back signal arriving at input point 86 of system 80 is such that it augments any signal propagated from input point 86 through the energy path of system 80 towards the output point 83. It will be apparent that this condition can be realised at any frequency if the electrical length of the complete system is maintained constant irrespective of frequency, and it will be understood by those skilled in the art that this requirement can be satisfied if the total number of periods of oscillation that occur during the time taken by the beam to traverse the two retarded-wave devices and the intermediate region is kept constant. For example, if under the required conditions 10 periods occur while the beam travels through device 80, 4 while it travels through the intermediate region and 10 while it travels intermediate region and 10 while it travels through device 81, then the conditions are still satisfied if 9, 6 and 9 periods occur. In the second example, the velocity of the beam in the interchange regions of devices 80 and 81 has been increased, and the velocity of the beam in the intermediate region embraced by the electrode 88 has been decreased by an appropriate amount to maintain the necessary conditions. It is therefore apparent that by simultaneous variation of the beam accelerating voltage and the potential applied to the auxiliary electrode 88, oscillations of continuously variable frequency may be generated in the system. One or other of the retarded-wave devices 80 or 81 may be made non-dispersive in character without modifying the mechanism of operation of the arrangement.

In Fig. 13, the mode of operation is exactly equivalent to that of Fig. 12, except that auxiliary electrode 88 of Fig. 12 is replaced by an electrode 88a which serves to direct the beam from one retarded-wave section to the next and also to vary the time taken by the beam in transit between the two sections by variation of the potential applied to electrode 88a. As in the arrangement of Fig. 12, one or other of the retarded-wave devices 80 and 81 of Fig. 13 may be made non-dispersive in character.

In Fig. 14 beam 14 is accelerated by the field between the cathode 18 and the electrode 90, which is substantially equivalent to the electrode 20 of Fig. 2, and passes through the interchange region of a retarded-wave device 91 into a retarding field produced by electrode 92, which is so arranged that the beam returns through the device 91 to the electrode 90 which also acts as a collector for beam 14. A terminal end 93 of the retarded-wave device is connected to a non-reflecting load, which may be the utilisation circuit. Terminal end 94 is connected to a load which absorbs only a portion of the power fed to it and reflects a fraction back into the retarded-wave section. It is thus apparent that the arrangement will generate oscillations if the phase of the signal reflected back from the load connected to 94 is such that it augments any signal propagated through the device from 94 toward 93. The operation of the device is exactly similar to that of Fig. 13, since the interaction processes between the electron beam and the waves propagated through the device while the beam is travelling in each direction can occur concurrently and independently. Thus by adjustment of the accelerating field and simultaneous variation of the reflecting field by alteration of the potentials applied to cathode 18 and electrode 92, the frequency of oscillation may be continuously varied.

If, in the present arrangement, bunches of electrons pass through the electrode 90 in returning towards the cathode and arrive at the cathode, it will be appreciated that according to the known phenomenon described by Coetier the virgin electron beam may become pre-bunched and hence, by suitable choice of geometry of the system, the phase of the pre-bunched beam with respect to the interacting field at the time when the electron bunches enter the interchange region may be such that the efficiency of the device is substantially increased. If, in this mode of operation, a cathode having an appreciable amount of secondary emission be utilised, then the total useful emission available from the cathode may be increased by the action of the returning electron beam.

The foregoing disclosure is presented as illustrative of the form the invention may take and is not intended to be limiting.

I claim:

1. A charged particle discharge device comprising means for projecting a beam of charged particles, a conductor for high frequency electrical energy, said conductor having high frequency radio signal input terminal means, output terminal means and a circuit portion directly connecting said input and output terminal means and extending for a substantial distance along the axis of, and adjacent to, said beam in continuously interacting, energy exchanging, electrical association with said beam, the electric fields created by the passage of high frequency radio signal energy along said circuit portion continuously interacting with the particles of said beam throughout the length of said circuit portion whereby said particles are energy modulated and said high frequency radio signal is amplified.

2. In a broad band high gain amplifying system, a path for radio frequency signal power comprising a signal input terminal means, signal output terminal means and a circuitous circuit portion directly connecting output terminal means through which radio frequency signal waves may pass from said input terminal means to said output terminal means and said output, and electron gun means having accelerating means to project an electron beam in continuously interacting, energy exchanging electrical association with the signal waves passing through said circuitous circuit portion, the ratio of the length of said circuitous path portion along said beam to the length of said circuitous path portion traversed by said radio frequency signal waves and the level of the accelerating voltage applied having such values that the component of velocity of said radio frequency signal waves in the direction of the beam and the velocity of said beam are of the same order of magnitude and amplification of said radio frequency signal is obtained over a broad band and is produced by the said continuously interacting energy interchange between the energy of said beam and the radio frequency signal energy in said circuitous circuit path portion.

3. In a high gain broad band energy interchange amplifying system, a path for radio frequency signal power in which modulation and amplification are combined comprising signal input terminal means, signal output terminal means and a retarded wave device directly connecting said signal input and output terminal means through which radio frequency signal waves may pass from said input terminal means to said output terminal means, and means to project an electron beam in electrical association with said retarded wave device and in continuously interacting, energy exchanging relation with the signal waves passing therethrough whereby a signal applied to said input terminal means is amplified over a broad band.

4. A high gain broad band energy interchange amplifying system having an energy supply unit and a radio frequency amplifying unit, said amplifying unit comprising signal input terminal means, signal output terminal means and a retarded wave device directly connecting said input and output terminal means through which radio frequency signal waves may pass from said input terminal means to said output terminal means, said energy supply unit comprising an electron gun arranged to project an electron beam in continuously interacting, energy exchanging, electrical association with the signal waves passing through said retarded wave device whereby a signal applied to said input terminal means is amplified over a broad band by cooperation with the electron beam.

5. In a high gain broad band energy interchange amplifying system, a concentric line comprising a helix forming an inner conductor thereof and a metallic tube forming the outer conductor thereof, a radio frequency signal power input connection to said tube at one point, a signal power output connection to said tube at another point, and means to project an electron beam along the axis of said helix in continuously interacting, energy exchanging relation with the radio frequency signal waves passing through said concentric line whereby a signal applied to said input connection is amplified over a broad band.

6. The combination set forth in claim 3, wherein said retarded wave device comprises a helix enclosing said beam.

7. The combination set forth in claim 3, wherein said retarded wave device comprises a concentric line.

8. The combination set forth in claim 3, wherein said retarded wave device comprises a waveguide through which the electron beam is projected axially and centrally thereof and which functions to reduce the component of velocity of the radio frequency signal waves in the direction of the beam to the same order of magnitude as the velocity of said beam.

9. In a high gain broad band energy interchange amplifying system, a path for radio frequency signal power in which modulation and amplification are combined comprising signal input terminal means, signal output terminal means and a wave retarding conductive winding directly connecting said signal input and output terminal means through which radio frequency signal waves may pass from said input terminal means to said output terminal means, and means to project an electron beam in electrical association with said winding and in continuously interacting, energy exchanging, amplifying relation with the signal waves passing therethrough whereby a signal applied to said input terminal means is amplified over a broad band.

10. A high gain broad band energy interchange amplifying system having an energy supply unit and a radio frequency amplifying unit, said amplifying unit comprising signal input terminal means, signal output terminal means and a wave retarding conductive winding directly connecting said input and output terminal means through which radio frequency signal waves may pass from said input terminal means to said output terminal means, said energy supply unit comprising an electron gun arranged to project an electron beam in continuously interacting, energy exchanging, amplifying electrical association with the signal waves passing through said winding whereby a signal applied to said input terminal means is amplified over a broad band by cooperation with the electron beam.

11. The combination set forth in claim 9, wherein said winding comprises a helix enclosing said beam.

12. The combination set forth in claim 9, wherein said winding forms the inner conductor of a concentric line.

13. In a high gain broad band high frequency interchange amplifying system, an electron gun source of an electron beam, a collector in the path of the electrons of said beam to collect said electrons, a wave retarding electrically conductive winding coaxially surrounding said electron beam path, a high frequency signal input circuit independent of said electron beam coupled to said winding adjacent the gun source end of the path of said beam, and an amplified high frequency signal output circuit coupled to said winding adjacent the collector end of said path, the signal waves passing through said winding being in continuously interacting, energy exchanging, amplifying association with said electron beam whereby high frequency signal energy supplied to said winding by said input circuit is amplified by cooperation with the electron beam.

14. The combination set forth in claim 13, wherein said signal input and output circuits are directly connected to said winding.

15. A traveling wave electron discharge device of the velocity modulation type comprising an elongated hollow waveguide, one end of said guide constituting an input terminal for introducing a high frequency wave into said guide for propagation therethrough, means forming a part of said guide for limiting the axial velocity of the wave along said guide to a value substantially less than the wave velocity in air, means adjacent to said end of said guide for projecting a beam of electrons through said guide in the direction of the longitudinal axis thereof, and the other end of said guide constituting an output terminal for utilizing said wave.

16. In a traveling wave amplifying system, a path for high frequency signal power in which modulation and amplification are combined comprising signal input terminal means, signal output terminal means and a dispersive retarded wave device directly connecting said signal input and output terminal means through which high frequency signal waves may pass from said input terminal means to said output terminal means, and means to project an electron beam in electrical association with said retarded wave device and in continuously interacting, energy exchanging, amplifying relation with the signal waves passing therethrough.

17. A traveling wave electron discharge device comprising means forming a dispersive energy transmission path for high frequency electrical waves, an input terminal at one end of said path for introducing a high frequency wave into said path for propagation therethrough, means adjacent to said one end of said path for projecting a beam of electrons in the direction of the longitudinal axis thereof in continuously interacting, energy exchanging, electrical association with the wave passing therethrough, and means at the other end of said path constituting an output terminal for utilizing said wave.

18. A traveling wave electron discharge device comprising means for projecting a beam of electrons, means forming a transmission path for high frequency electrical energy, said path including high frequency signal input terminal means, output terminal means and a dispersive retarded wave device directly connecting said input and output terminal means and extending for a substantial distance along the axis of, and adjacent to, said beam in continuously interacting, energy exchanging, electrical association with said beam, the electric fields created by the passage of high frequency signal energy along said retarded wave device continuously interacting with the electrons of said beam throughout the length of said device, whereby said electrons are energy modulated and said high frequency signal is amplified.

RUDOLF KOMPFNER.

References Cited in the file of this patent

UNITED STATES PATENTS

| Number | Name | Date |
|---|---|---|
| 2,233,126 | Haeff | Feb. 25, 1941 |
| 2,300,052 | Lindenblad | Oct. 27, 1942 |
| 2,367,295 | Llewellyn | Jan. 16, 1945 |
| 2,375,223 | Hansen et al. | May 8, 1945 |

OTHER REFERENCES

Article entitled, "Wideband Microwave Amplifier Tube," pp. 90–92, inclusive, of "Electronics," for November 1946. Copy in Div. 54.

Article entitled "Broad Band Tube," pages 57 and 103, of "Electronic Industries" for December 1946. Copy in Div. 54.